G. A. MOSS.
SAFETY FIRST DEVICE.
APPLICATION FILED APR. 19, 1916.
1,204,475.
Patented Nov. 14, 1916.
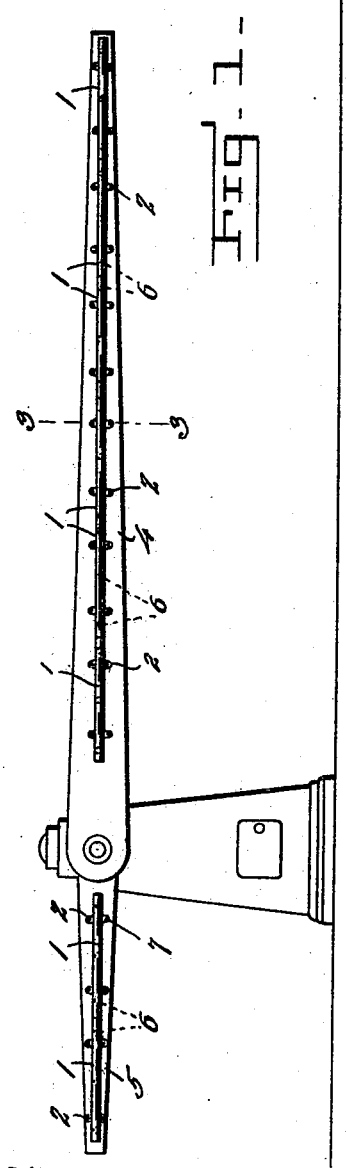
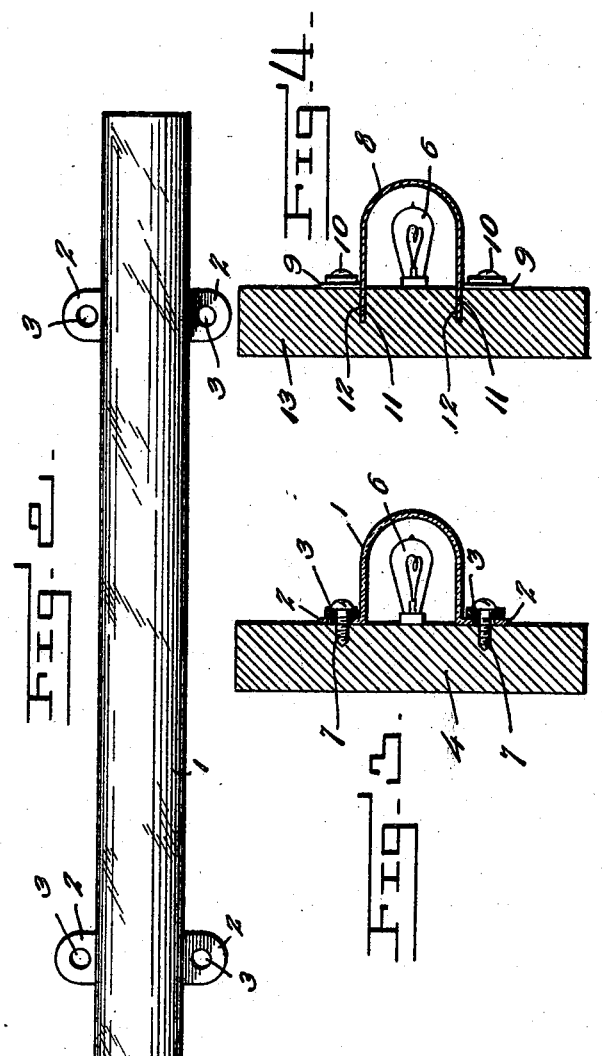
Witness
Inventor
George A. Moss.
by E. K. Bond
Attorney

UNITED STATES PATENT OFFICE.

GEORGE A. MOSS, OF CHICAGO, ILLINOIS, ASSIGNOR OF ONE-HALF TO GEORGE E. HARTMAN, OF CHICAGO, ILLINOIS.

SAFETY-FIRST DEVICE.

1,204,475.  Specification of Letters Patent.  Patented Nov. 14, 1916.

Application filed April 19, 1916. Serial No. 92,214.

*To all whom it may concern:*

Be it known that I, GEORGE A. Moss, a citizen of the United States, residing at Chicago, in the county of Cook and State of Illinois, have invented certain new and useful Improvements in Safety-First Devices, of which the following is a specification.

This invention relates to certain new and useful improvements in safety first devices, having for its objects among others to provide a simple yet efficient device for use upon the arms or other parts of gates at railroad crossings, bridges and the like, as well as upon any and all other forms of safety first signals or devices. Also the device is applicable for other uses, for ornamental purposes, it being readily attachable, can be made in any desired lengths and size, and when used upon the arms of gates at crossings, or in fact wherever used, it is preferably made in sections, so that in case of breakage of any one section the same can be easily and quickly replaced and the others will still serve their function.

Other objects and advantages of the invention will hereinafter appear, and the novel features thereof will be specifically pointed out in the appended claims.

The invention is clearly illustrated in the accompanying drawings, which, with the numerals of reference marked thereon, form a part of this specification, and in which—

Figure 1 is a side elevation showing the use of the invention upon the arms of a railroad crossing gate. Fig. 2 is an enlarged face view of one of the sections. Fig. 3 is a cross section, on an enlarged scale, on the line 3—3 of Fig. 1. Fig. 4 is a cross section similar to Fig. 3, of a slightly modified form.

Like numerals of reference indicate like parts throughout the several views.

My improvement may be made of glass, celluloid or any other suitable transparent or semi-transparent material. It may be made of any desired length, dependent upon the use. If formed of glass it takes the general form shown in Fig. 3 in which 1 indicates the arched portion and 2 the attaching lugs or flanges. The latter are integral with the arched portion and there may be as many of these lugs or flanges to each member as may be desired. The lugs are formed with openings 3 for the reception of means by which the member is affixed in position. This glass member may be used for any purpose where it is desired to provide a covering for the light, electric or otherwise. It may be made ornamental if desired. For use in safety first devices it is proposed to make the glass red to indicate danger; for other uses it may be of any other preferred color. In the present instance I have chosen to show its use as upon the arms 4 and 5 of a railroad crossing gate. Here it is shown as arranged upon the vertical faces of the arms and on each arm are a multiplicity of the members, arranged over the electric lights 6. Should any one of the members 1 become broken the others will serve to indicate danger till the broken one can be replaced. This can be quickly and easily done by simply removing the attaching screws 7. The glass may be of any desired thickness, depending upon the nature of its use, and the place.

In some instances I may make the member of celluloid as seen at 8 in Fig. 4. Whether made of glass or celluloid or analogous material the general appearance will be the same. Fig. 2 is a correct representation of either. When made of celluloid the body portion will be formed with the integral lugs or flanges 9 with holes for the reception of the attaching means, the same as when made of glass and attached to the arms or other supports by screws or the like 10 as before, but in some instances I make the member with the parallel extensions 11 as seen in Fig. 4, which may be of any desired length, dependent upon the conditions under which it is to be used. In use these extensions are designed to be inserted in kerfs or the like 12 in the arm or other support 13 to which the member is applied. It is to be understood that these extensions as well as the attaching lugs or flanges are integral with the arched portion of the member. These extensions give great rigidity to the member when attached and prevent undue strain on the attaching lugs. This form, as well as the other, can be used for decorative purposes. It can also be made in any desired length and used in sections when required.

Where, in the following claims, I make use of the term "transparent" in defining the member I mean to include a structure having the property of transmitting rays of light, whether wholly transparent or translucent.

What is claimed as new is:—

1. A transparent member having an arched body portion and integral attaching members and integral extensions at an angle to said attaching members.

2. The combination with a support, of a plurality of transparent members attached thereto and having extensions engaged in recesses in said support.

3. A support having kerfs, and a transparent member having lateral integral attaching lugs secured to said support, and substantially parallel extensions secured in said kerfs.

In testimony whereof I affix my signature in the presence of two witnesses.

GEORGE A. MOSS.

Witnesses:
HARRY F. BARHOLZER,
JOHN R. ANDERSON.

Copies of this patent may be obtained for five cents each, by addressing the "Commissioner of Patents, Washington, D. C."